Aug. 19, 1930.   S. G. BOND   1,773,215
TIRE INDICATOR SWITCH
Filed Sept. 27, 1927   2 Sheets-Sheet 1

Inventor
S. G. BOND
By Percy H. Moore
Attorney

Aug. 19, 1930.    S. G. BOND    1,773,215
TIRE INDICATOR SWITCH
Filed Sept. 27, 1927    2 Sheets-Sheet 2
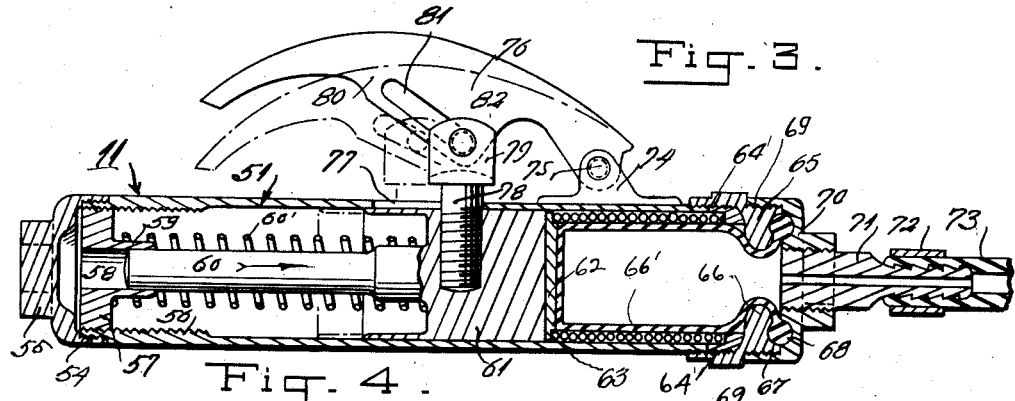
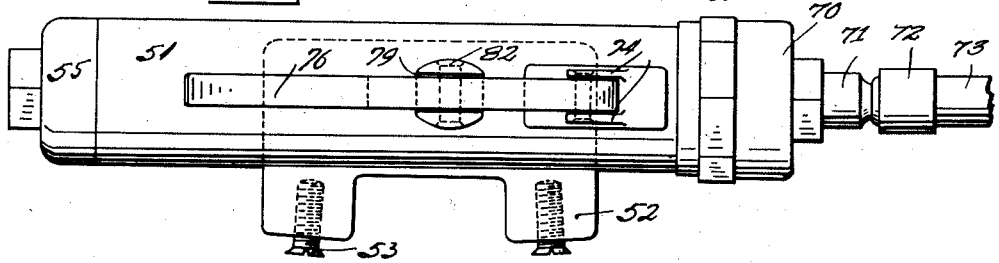
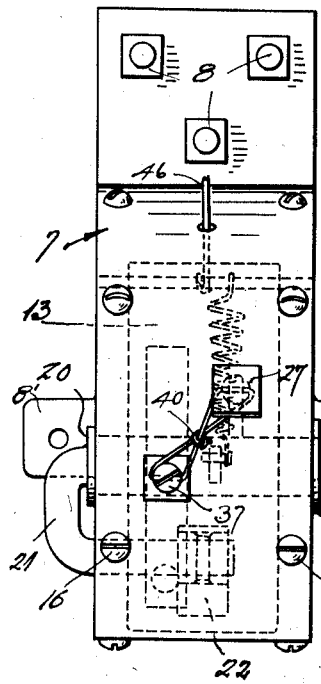
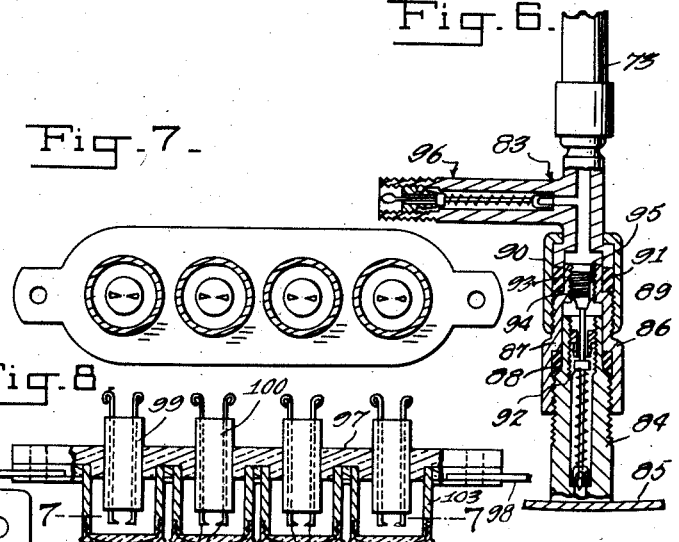
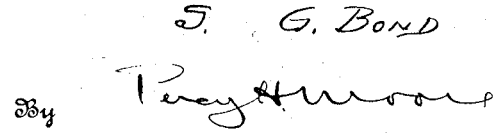
Inventor
S. G. Bond
By Percy H——
Attorney Patented Aug. 19, 1930

1,773,215

UNITED STATES PATENT OFFICE

SHERMAN G. BOND, OF WICHITA, KANSAS

TIRE INDICATOR SWITCH

Application filed September 27, 1927. Serial No. 222,352.

My invention relates to improvements in signaling devices and is more particularly directed to that type of device employed for indicating to the driver of an automobile the moment air within any one of the tires decreases to a certain degree.

Heretofore in signaling devices of this character it has been customary to provide such a device that will render to the operator a signal or an alarm immediately upon the deflation of any one of the tires, but in such devices it has been impossible for the operator of a machine to ascertain while the machine is in motion the exact condition of each tire. It is therefore the purpose of my invention to provide an efficient signaling means whereby the operator of a machine equipped with my device will be immediately notified in the event any one of the tires thereof is deflated to a predetermined degree.

The object of my invention is to provide a device of the class described wherein a suitable signal will be given the operator of a machine when the tires thereof are deflated to a certain predetermined degree.

Still another object of my invention is to provide a plurality of signaling devices of the character set forth wherein the driver of a machine may be advised during the movement of the machine the amount of air within each of the tires thereof.

Another object of the invention is to provide a signaling device of the character set forth having certain parts thereof in open communication with the pneumatic tube within each of the tires.

Another object of the invention is to provide means for regulating the operation of the device when the air in any one of the tires reaches a certain predetermined degree.

Another object of the invention is to provide an indicating means of the character herein set forth which is connected directly to the rim of each wheel and includes means for the equalization of the air within the device with that in the tube.

Another object of the invention is to provide a signaling device, the major portion of which is carried by the brake housing of each wheel, while the secondary portion is carried by the corresponding wheel.

A further object of the invention is to provide a suitable indicating means positioned in view of the operator, preferably upon the instrument board for indicating to him the instant the air within any one of the tires decreases to a predetermined point.

Another object of the invention is to provide a suitable indicating means of the character described wherein the elements thereof are positioned in such a manner that the general appearance of the running gear of a machine is unmarred.

Another object of the invention is to provide a signaling device of the class described which includes a switch so related thereto that upon the closing of the switch the device will be rendered operative.

With these and other objects in view the invention resides in the combination and arrangement of parts, all of which will be more clearly understood from the hereinafter specification when taken in consideration with the accompanying drawings, in which Figure 1 is a diagrammatic view showing the top plan view of the running gear of an automobile, the same being equipped with four wheel brakes and to each of which are applied certain elements of my improved indicating means.

Figure 4 illustrates a side elevation of the element shown in Figure 3, but illustrates more particularly the means for applying the same to the wheel.

Figure 5 is a side elevation of the switch mechanism disclosed in Figure 2 and fixed to a portion of the brake drum.

Figure 6 is a detail view of the means employed for forming communication between the valve stem of a pneumatic tube and the element disclosed in Figures 3 and 4, at the same time permitting inflation of the pneumatic tube without its removal from the valve stem.

Figure 7 is a front elevation of the means positioned in view of the operator for indicating to him the condition of each tire.

Figure 8 is a horizontal sectional view taken centrally through the indicating means shown in Figure 7, and Figure 9 is a detail view illustrating a weighted element that is adapted to be positioned upon each wheel diametrically thereof with respect to the means disclosed in Figure 2, thus properly balancing the wheel.

Figure 1:
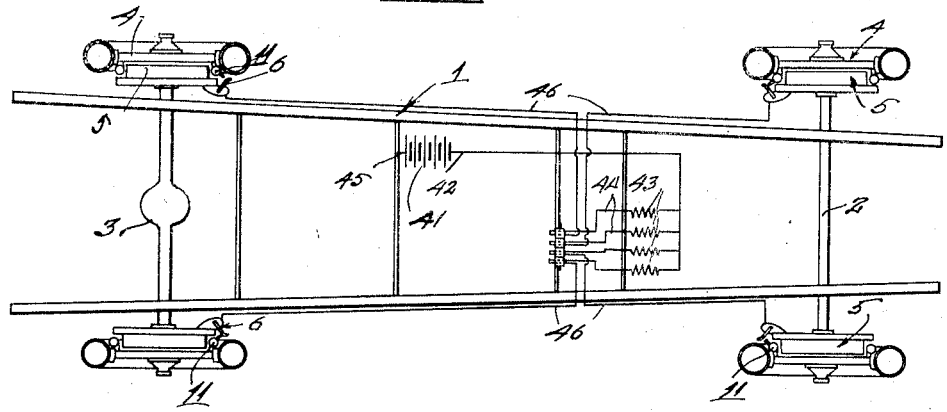

Referring to the accompanying drawings in detail wherein like reference characters denote corresponding parts throughout the several views, the numeral 1 indicates generally the chassis of an automobile, the same having the usual front and rear axles 2 and 3 upon which are mounted wheels 4, each of which has cooperating therewith a braking mechanism 5 to which certain elements of my hereinafter described invention are applied.

It is, of course, to be understood that while I have herein shown and described my invention as being applied to a machine equipped with four wheel brakes, I do not intend to limit myself to this application as the same may be applied upon any type of machine and one having any number of braking elements.

Figure 2:
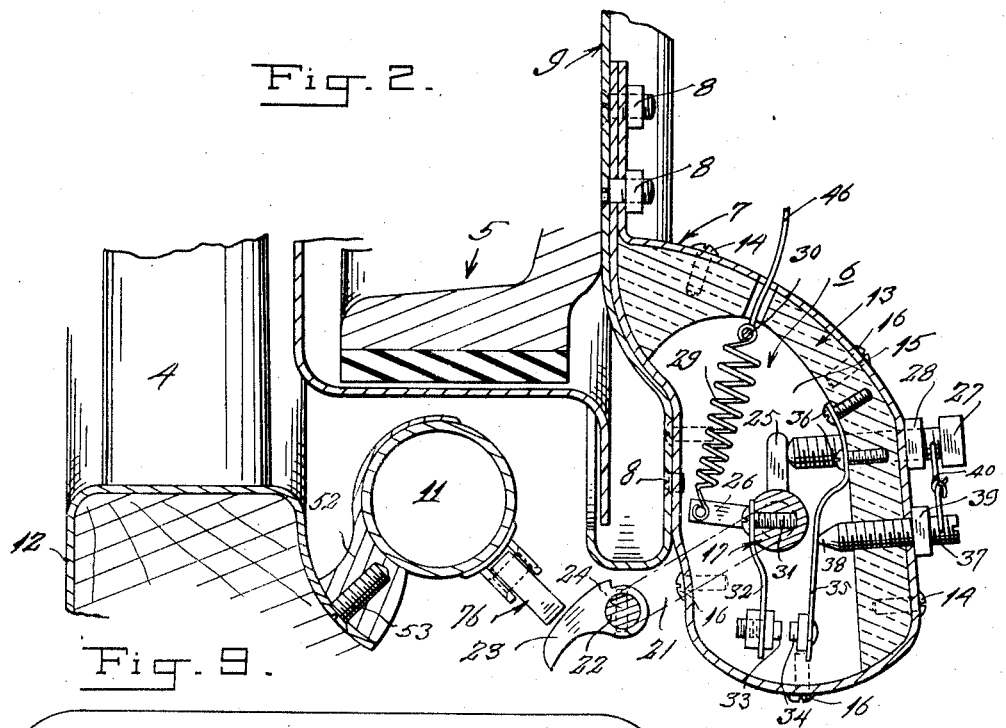
Figure 2 is an enlarged detail view taken through the center of one of the wheels and showing the brake drum with my invention applied thereto and cooperating with a certain part applied to the rim of the corresponding wheel.

As further disclosed in Figure 1, I have generally indicated upon each brake drum thereof a certain switch mechanism 6, which is more clearly disclosed in Figure 2 and comprises a suitable metallic casing 7 which is connected by bolts 8, some of which pass through extension 8' formed with the rear wall of the casing, to a stationary disc 9 forming a part of the brake mechanism indicated generally by the numeral 5. Cooperating with the switch mechanism indicated at 6 is a switch operating device 11 which is secured to the adjacent side of a rim 12 forming a part of the usual wheel 4.

The switch mechanism disclosed in Figure 2 includes a casing 7 which has positioned therein a suitable insulating block 13, secured to the interior of the casing by bolts 14. Upon referring to Figure 5, it will be noted that the block 13 is positioned centrally of the casing 7 and upon each side thereof, and within the casing 7 is placed side walls 15 of fiber or other insulating material, the same being held properly in place by the bolts 16.

The walls 15 of the switch mechanism 6 are provided with aligned openings through which passes an oscillatory shaft 17, one end of which projects beyond the side wall 15 of the casing and has placed thereupon a suitable washer 18 which is held against the side wall 15 by a locking pin 19. The other end of the shaft 17 has formed integral therewith an angular flange 20 which abuts against the outer side of the other wall 15. The shaft 17 continues beyond the flange 20 and forms an angular arm 21, the free end 22 of which extends backwardly and lies parallel with the shaft 17 for the reception there on of an operating finger 23, the same being secured to the arm 22 in any suitable manner, preferably by means of a rivet 24.

That portion of the oscillatory shaft 17 which is confined between the side walls 15 of the switch mechanism 6 has formed either integral therewith or detachable therefrom in any desired manner right angular extensions 25 and 26, the former being adapted to engage an adjusting screw 27 movable through the front wall of the switch mechanism and locked in a predetermined position by a locking nut 28, the purpose of the adjusting screw being adapted to limit the oscillatory movement of the shaft 17 by resilient means hereinafter set forth.

The extension 25 is normally maintained in contact with the end of the adjusting screw 27 by a coiled spring 29, one end of which is connected to the free end of the extension 26, carried by the shaft 17, while the other end is coiled about a pin 30 passing through the fiber side walls 15 of the switch casing.

The intermediate portion of the shaft 17 has detachably secured thereto by a bolt 31 a spring arm 32 the free end of which carries a suitable electrical contact point 33 adapted to engage a corresponding like point 34 carried by a spring arm 35 fixed by the bolts 36 to the insulating block 13 positioned within the switch casing.

In order to regulate the exact movement in which the two contacts 33 and 34 will engage upon the swing of the arm 21, I have provided an adjustable screw 37 which passes through the front wall of the casing and has an engagement point 38 bearing upon the spring 35, the bolt 37 being maintained in a predetermined position by means of a locking nut 39.

In order to render the device operative and to remove the objectional click that would be caused by the engagement of the extension 25 with the bolt 27, I have formed the latter of hard insulating fiber or the like and in order to further prevent movements of either the screw 27 or 37 I have connected the two by a suitable connecting wire 40. It is, of course, to be understood that the fiber adjusting bolt may be removed and one formed of steel or the like substituted therefor, but in such an event it would be necessary to insulate the same properly from the casing 7 and in the use of this type of bolt, I would dispense with the wire connecting element 40 and substitute therefor one formed of suitable insulating material such as catgut or the like.

In following out the circuit through the above described switch, it will, of course, be understood that I have provided a battery 41, as shown in Figure 1, the positive terminal of which has connected thereto a lead 42, having therein a switch 42', which passes to a series of coils 43, each of which are in turn connected to the indicating means disclosed in Figures 7 and 8 by wires 44. The negative side of the battery 41 is grounded to the chassis of the machine, as indicated at 45. Passing from the indicating means positioned upon the dash are wires 46 which pass to the switch mechanism disclosed in Figure 2 and connected thereto through the pin 30. Thus it will be seen that current flowing through the wires 46 will pass downwardly through the spring 29, arm 26, shaft 17 and to the contact 33 carried thereby. When the shaft 17 is rocked in a manner hereinafter disclosed the contact point 33 will engage the contact point 34 and by reason of the latter being grounded to the chassis of the machine through the adjusting screw 37 and the switch casing 7, the circuit will be completed and the indicating means operated in a manner hereinafter described.

Figure 3:
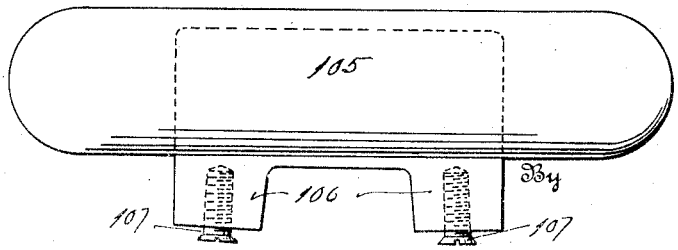
Figure 3 is a detail view showing in section the structure of the operating element applied to the wheel and having communication with the pneumatic tire thereon.

In order to assure the operation of the hereinabove described switch mechanism upon the deflation of a tire, I have provided upon each wheel rim a suitable pressure actuated element 11, illustrated more particularly in detail in Figures 3 and 4. This pressure actuated element includes a cylindrical casing 51 which is secured to the rim 12 of the wheel by a block 52, the same being suitably connected to the exterior of the casing by welding or the like and having its lower portion connected to the rim by screws 53.

The casing 51 is provided with an exteriorly threaded portion 54 which receives thereon a cap 55 closing one end of the cylinder. The corresponding end of the cylinder 51 is interiorly threaded, as indicated at 56, and has movable therein throughout the threaded portion a disc 57, the intermediate portion of which has an opening 58 and an outwardly extending sleeve 59 for the reception therein of the end of a piston rod 60, the other end of the rod having a piston head 61 which fits snugly within the casing 51. Coiled about the piston rod 60 and having one end bearing upon the piston end 61 and the other encircling the extending sleeve 59 is a coiled spring 61', the purpose being to move the piston head 61 longitudinally of the casing 51 in the direction away from the disc 57.

The piston head 61 has positioned thereagainst a disc 62, the marginal edge of which is reduced, as indicated at 63, to receive therein one end of a coiled spring 64. It will be noted that the coiled spring 64 is maintained within the cylinder 51 by an end piece 65 recessed to receive the end of the cylinder 51, the ring 65 being maintained upon the cylinder 51 by threaded engagement with the exterior of the cylinder 51, as indicated at 64'. The ring 65 has an inwardly projecting portion 66 and a recess 67 in which is received an enlarged bead 68 formed about the mouth of an expansible element 66'. The expansible element 66' projects inwardly of the cylinder 51 and is maintained within the coiled spring 64 and against the disc 62. With this structure it will be noted that the coiled spring prevents the element 66' from sticking to the interior of the cylinder 51, thus rendering the expansible member movable at all times.

To retain the beads 68 of the element 63 within the recess 67, I have provided exteriorly of the ring 65 a threaded portion 69 which receives thereon a clamping cap 70 which when screwed downward upon the ring 65 clamps therebetween the bead 68 of the expansible element. The intermediate portion of the cap 70 is interiorly threaded and receives therein a stem 71 to which is connected in any suitable manner, as indicated at 72, a tubing 73, formed preferably of flexible material, which is connected to the usual valve stem in a manner hereinafter described.

Formed exteriorly of the cylinder 51 and adjacent the end having therein the expansible element 53 are spaced ears 74 between which is pivoted as at 75 a swinging lever 76, one edge of which is cam shaped to engage the finger 23 carried by the shaft 17, as will be more fully described. In order to prevent the completion of an electrical circuit, as will hereinafter be distinguished, the lever 76 is formed of wood or some desired insulating material.

Carried by the piston head 61 and extending through a longitudinal slot 77 formed in the casing 51 is a pin 78, the head of which is suitably slotted, as indicated at 79, and receives therein a web 80 carried by the lever 76. The web 80 has formed therein a slot 81 through which passes a bolt 82 carried by the slotted head 79 of the bolt 78. Thus it will be seen that when the piston 61 is moved in the direction toward disc 57, the lever 76 through its connection with the pin 78 will be moved as shown in Figure 3 by dotted lines.

To connect the pressure actuated element 11 with a pneumatic tube within one of the tires, the tubing 73 carries at its free end a two way connection 83, one passage of which is adapted to be connected to the valve stem 84 of the pneumatic inner tube 85. Forming the connection between the element 83 and the valve stem 84, I have provided an intermediate member 86 which screws downwardly upon the exterior threads of the valve stem 84 and clamps between the reduced portion of the valve stem 84 and a shoulder 87 carried thereby a washer 88. The intermediate member 86 is provided with a reduced portion 89 which is connected to the element 83 by a swivelled connection 90 which, when screwed downwardly upon the reduced portion 89, clamps between the end of the element 83 and a shoulder formed on the reduced portion 89 a washer 91, thus preventing the escape of air through any of the connections. The valve stem 84 carries the usual valve 92 and in order to hold the same open when the tube 73 is connected thereto, I have provided within the reduced end of the intermediate member 86 a threaded portion 93 which has adjustable therein a stem 94, the end portion of which engages the valve 92 and holds the same from its seat. The stem 94 is further provided with longitudinal slots 95 which permit the free passage of air from the interior of the pneumatic tube 85 to the expansible element 63 through the flexible tube 73.

The connection 83 is further provided with an angular extension 96 which has formed therein the usual valve employed in the valve stem 84 and to which is connected the flexible tubing from a suitable inflating pump or the like.

The indicating means which I have illustrated in Figures 7 and 8 includes a base member 97 which is connected to the usual instrument board 98 by suitable connecting elements (not shown). Passing through the base 97 are a plurality of sparking elements 99, each consisting of an insulating tube 100 which has formed therein a pair of points 101 and which are spaced apart to form a sparking gap 102. The active end of the sparking elements is enclosed by a cylindrical tubing 103 secured in any desired manner to the base 97, the tube 103 having a transparent closure 104.

As disclosed in Figure 9, each wheel 4 has positioned upon its rim, diametrically to that of the pressure actuated element 11. a cylindrical weight 105 to which is secured by welding or the like a pair of spaced legs 106 which are adapted to engage the rim flange in a manner similar to that of the pressure actuated element and secured thereto by suitable screws or bolts 107, the purpose of this member 105 being to counterbalance the wheel after the pressure actuated element has been placed thereon.

Having thus fully described my invention, it is believed that its operation will be clearly apparent when taken in connection with the accompanying drawings, but in order to more clearly set forth this operation, I will now endeavor to give a brief summary of the same.

Assuming that an automobile is equipped with the device herein illustrated and described and that the flexible tube 73 has been connected to the valve stem 84 of the pneumatic tube: Upon the application of the tube 73 to the valve stem 84 the valve within the latter will be held open and air passing therethrough and through the tube 73 will enter into the expansible chamber 66' carried within the cylinder 51 and as pressure is exerted upon the expansible element 66' the same will move backwardly to a position indicated by the dotted lines. During the movement of the expansible member 66', it is, of course, apparent that the piston 61 will be moved longitudinally of the casing 51 and by reason of the connection between the piston 61 and the lever 76, the latter will be moved downwardly to a position indicated by the dotted lines. When the lever 76 has been moved downwardly, the wheel is free to rotate without actuating the switch mechanism described in Figure 2, but in the event air should escape from the tire, it will, of course, decrease the pressure within the expansible chamber 66' and by reason of the spring 60', the piston head 61 will be moved forwardly and during this movement the lever 76 will be moved upwardly upon its pivot. This movement of the lever continues during the deflation of the tire and when the same has deflated to such a degree that it would be dangerous to continue its use, the lever 76 will engage the finger 23 carried by the oscillatory shaft 17, and every time the cylinder 51 makes a revolution, the lever 76 carried thereby will engage this finger. It is, of course, to be understood that during the deflation of the tire the initial movement of the shaft 17 will be insufficient to cause engagement between the contact points 33 and 34, but upon continued deflation the lever 76 will be moved further outwardly, thus increasing the swinging movement of the shaft 17 and finally causing the contact points 33 and 34 to engage. The shaft 17 after being moved by the lever 76 is returned to its original position by the coil spring 29 and limited in its return movement by the extension 25 engaging the bolt 27.

Upon the engagement of the contacts 33 and 34 the flow of current to the sparking points 101 will be unrestricted and a spark will occur therebetween, indicating to the operator that the tire has deflated to such a degree as to warrant his attention.

In the foregoing explanation it has been assumed that the switch 42' was closed to complete the circuit including the switch mechanism. Thus it will be seen that upon the breaking of the switch the circuit including the switch mechanism will be broken, thus preventing any short-circuiting of the switch and the running down of the battery when the car is at a standstill.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described my invention, what I claim as new and desire to secure by Letters Patent, is:—

1. In a tire pressure indicator, a signal controlling switch, and a pressure controlled actuating device therefor comprising a casing having an inlet end provided with an externally threaded surface and an inwardly projecting flange, a threaded cap engaging said threaded surface and having a nipple for connection with a tire, a piston in said casing, a spring for sliding the piston in one direction, an air sack in the casing forming an expansible and contractible element having an open end in communication with the nipple for sliding the piston in the opposite direction, said sack being provided at its said open end with a beaded edge projecting outwardly over the flange and clamped between the same and the cap, a switch actuating member pivoted to rock upon the casing and having a slot inclined to the plane of travel of the piston, and a connection between the piston and switch actuating member pivotally and slidably engaging the slot in the latter.

2. In a tire pressure indicator, a signal controlling switch, and a pressure controlled actuating device therefor comprising a casing having an inlet end provided with an externally threaded surface and an inwardly projecting flange, a threaded cap engaging said threaded surface and having a nipple for connection with a tire, a piston in said casing, a spring for sliding the piston in one direction, an air sack in the casing forming an expansible and contractible element having an open end in communication with the nipple for sliding the piston in the opposite direction, said sack being provided at its said open end with a beaded edge projecting outwardly over the flange and clamped between the same and the cap, and a sector-shaped switch actuating member pivoted at one end to rock upon the casing and having an outer cam-shaped switch actuating surface, said member being provided on its inner side with a web having a slot inclined to the plane of travel of the piston and slidably and pivotally connected with the piston for actuation thereby.

3. In a tire pressure indicator, and in combination with a pressure controlled switch actuating device, a signal controlling switch comprising a casing, a rock shaft journaled therein, a pair of leaf spring contact fingers, provided with coacting circuit closing contacts, respectively carried by the shaft and casing, adjustable members acting on the shaft and contact carried by the casing for relatively adjusting said contacts, means acting on the shaft for normally maintaining the contacts out of engagement, and an operating arm connected with the shaft and arranged to be engaged and actuated by the switch actuating device.

4. In a tire pressure indicator, and in combination with a pressure controlled switch actuating device, a signal controlling switch comprising a casing, a rock shaft journaled therein, a pair of coacting leaf spring fingers, provided with circuit closing contacts, respectively carried by the shaft and casing, adjusting screws on the casing and respectively acting on the shaft and second-named contact for adjusting said contacts relatively to the other, means acting on the shaft for normally maintaining the contacts out of engagement, and an operating arm connected with the shaft and arranged to be engaged and actuated by the switch actuating device.

5. In a tire pressure indicator, and in combination with a pressure controlled switch actuating device, a signal controlling switch comprising a casing, a rock shaft journaled therein, a pair of crank arms on said shaft, a pair of leaf spring contact fingers, provided with coacting circuit closing contacts, respectively carried by the shaft and casing, a spring connected to one of the crank arms on the shaft and acting on the shaft for normally maintaining said contacts out of engagement with one another, an adjustable stop engaging the other of said crank arms on the shaft for limiting the movement of the shaft under the action of the spring, and an adjusting member on the casing for adjusting the contact carried by the casing with respect to the contact carried by the shaft.

In testimony whereof I affix my signature.

SHERMAN G. BOND.